(12) United States Patent
VerBrugge

(10) Patent No.: US 10,422,411 B2
(45) Date of Patent: Sep. 24, 2019

(54) SYNTHETIC ROPE TERMINATION

(71) Applicant: The Crosby Group LLC, Tulsa, OK (US)

(72) Inventor: Peter VerBrugge, Tulsa, OK (US)

(73) Assignee: The Crosby Group LLC, Tulsa, OK (US)

( * ) Notice: Subject to any disclaimer, the term of this patent is extended or adjusted under 35 U.S.C. 154(b) by 229 days.

(21) Appl. No.: 15/397,911

(22) Filed: Jan. 4, 2017

(65) Prior Publication Data

US 2017/0204938 A1 Jul. 20, 2017

Related U.S. Application Data

(60) Provisional application No. 62/278,796, filed on Jan. 14, 2016.

(51) Int. Cl.
| | | |
|---|---|---|
| *F16G 11/12* | (2006.01) | |
| *F16G 11/03* | (2006.01) | |
| *F16G 11/14* | (2006.01) | |
| *F16G 11/04* | (2006.01) | |

(52) U.S. Cl.
CPC ............ *F16G 11/12* (2013.01); *F16G 11/03* (2013.01); *F16G 11/046* (2013.01); *F16G 11/14* (2013.01); *F16G 11/146* (2013.01)

(58) Field of Classification Search
CPC ............ Y10T 24/3916; Y10T 24/3998; F16G 11/046; F16G 11/146; F16G 11/14; F16G 11/03; F16G 11/12; F16G 11/0146
See application file for complete search history.

(56) References Cited

U.S. PATENT DOCUMENTS

| | | | |
|---|---|---|---|
| 1,807,314 A | * | 5/1931 | Humphreys et al. ........................ F16G 11/046 24/129 R |
| 2,174,192 A | * | 9/1939 | Meighan ................. F16G 11/00 24/129 R |
| 2,193,236 A | | 3/1940 | Meighan |
| 2,439,141 A | | 4/1948 | Meighan |
| 2,595,806 A | | 5/1952 | Morris |
| 2,602,206 A | | 7/1952 | Rishel |
| D297,811 S | | 9/1988 | Payan |
| 5,136,755 A | | 8/1992 | Shaw |
| 6,012,204 A | | 1/2000 | Roethler |
| 6,170,145 B1 | | 1/2001 | Lucas |
| 6,317,935 B1 | | 11/2001 | O'Rouke |
| 7,228,599 B2 | | 6/2007 | Dupont |
| 8,096,024 B2 | | 1/2012 | Smith et al. |
| 8,205,922 B1 | | 6/2012 | Ohman, Jr. |

FOREIGN PATENT DOCUMENTS

EP          1640623          3/2006

\* cited by examiner

*Primary Examiner* — Robert Sandy
(74) *Attorney, Agent, or Firm* — Head, Johnson, Kachigian & Wilkinson, PC

(57) ABSTRACT

A rope termination device. The device includes a cylindrical body having a first opening in a first axial end of the body. A second opening in an opposed, second end of the body is connected by a passageway through the body to the first opening. At least one circular channel is in communication with the second opening. A continuous helical groove is provided around a circumference of the cylindrical body. An attachment connector is provided near the second end of the body.

17 Claims, 5 Drawing Sheets

SYNTHETIC ROPE TERMINATION

CROSS-REFERENCE TO RELATED APPLICATIONS

This application claims priority to and the benefit of U.S. Provisional Patent Application Ser. No. 62/278,796, filed Jan. 14, 2016, which is herein incorporated in its entirety by reference.

BACKGROUND OF THE INVENTION

1. Field of the Invention

The present invention relates to a rope termination and to a method of terminating a rope for lifting or hoisting applications. In particular, the present invention is directed to a rope termination device for lifting or hoisting applications wherein a rope may be secured to a termination device in the field without tools or fasteners and wherein the rope is self-tightening to the termination device.

2. Description of the Related Art

Rope termination devices or elements utilized for lifting or hoisting of loads are used in a wide variety of applications.

Wire rope termination fittings come in a variety of configurations including those shown in Applicant's prior U.S. Pat. No. 6,170,145 entitled Method Of Securing A Termination Element To An End Portion Of A Wire Rope.

In addition, some types of terminations require clamps, clips or other elements secured at or near the end of the rope.

More recently, various types of synthetic rope have been employed for lifting or hoisting of loads.

Synthetic ropes or cables may be woven or braided of individual strands or otherwise constructed of polymer material, such as nylon, polyester or other materials. Synthetic ropes are known to have excellent load limits while being relatively lightweight and durable.

Synthetic rope or cable is negatively impacted by cuts, cracks or breaks, excessive wear, nicks, gouges or damage from heat or sunlight. Synthetic rope should be protected from being cut or abraded by sharp corners, sharp edges or sharp bends. Synthetic ropes which suffer cuts, nicks or gouges are to be taken out of service.

Synthetic rope or cable is negatively impacted by cracks or breaks, excessive wear, nicks, gouges or damage from heat or sunlight. When a rope or cable is bent, the working load limit of the rope is reduced by a bending factor. The bending factor ($E_B$) can be calculated according to the formula:

$$E_B = 1 - \frac{0.5}{\sqrt{D/d}}$$

The diameter D represents the diameter of the element around which the rope or cable is bent. The diameter d represents the diameter of the entire rope or cable. The D/d ratio is the ratio of the diameter around which the rope is bent divided by the diameter of the rope or cable.

It will thus be appreciated that the rope or cable has an efficiency related to the various D/d ratios.

Various types of termination devices have been suggested in the past for ropes or cables. For example, procedures for termination of synthetic rope include hand splicing, mechanical splicing, and/or fusing of the synthetic rope.

Smith et al. (U.S. Pat. No. 8,096,024) discloses a rope termination device for an aramid-based rope having a socket 90 with a tapered passageway to accept a conical wedge 100.

Dupont (U.S. Pat. No. 7,228,599) discloses a cord clasp 10 for a cord including a synthetic cord, terminating for transmitting a tensile load such as a bicycle braking actuator.

Shaw (U.S. Pat. No. 5,136,755) discloses an end clamp having a pair of tapered elements for a composite rope.

Morris et al. (U.S. Pat. No. 2,595,806) discloses a rope fitting including a body member 2 having an axial bore 4 therethrough. The rope passes through the bore 4 and then around peripheral groove 11. The end 15 of the rope is retained under a loop portion of the rope.

Notwithstanding the foregoing, it is desirable to provide a synthetic rope termination for lifting or hoisting applications.

It would further be desirable to provide a synthetic rope termination which can be installed or rigged in the field without any tools or fasteners.

It would further be desirable to provide a synthetic rope termination wherein the rope is self-tightening to the termination device.

It would further be desirable to provide a synthetic rope termination that minimizes bends in the rope in order to maximize the efficiency of the device or fitting.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
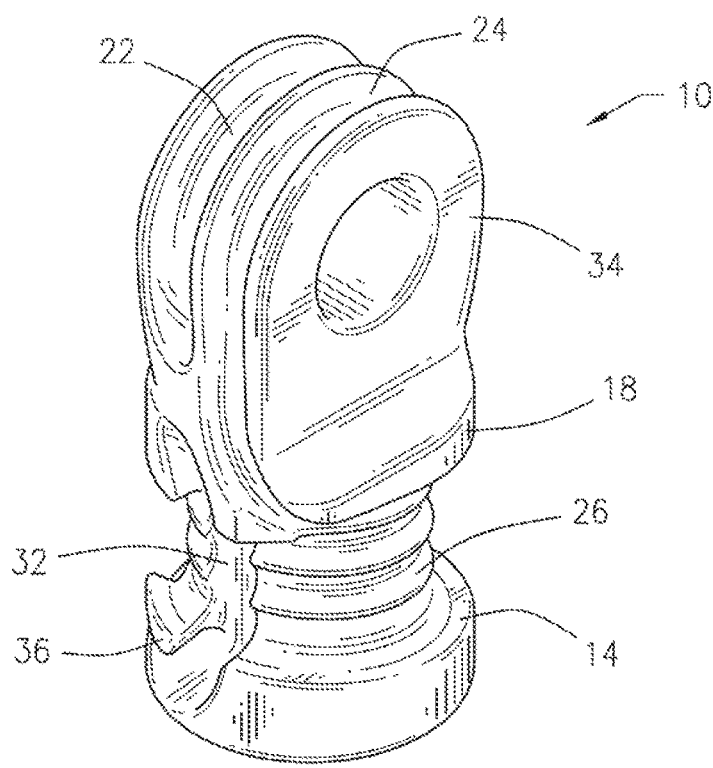
FIG. 1 illustrates a perspective view of a first preferred embodiment of a rope termination device constructed in accordance with the present invention.

Referring to the drawings in detail, FIG. 1 illustrates a perspective view of a first preferred embodiment of a rope termination device 10 constructed in accordance with the present invention.

Figure 2:
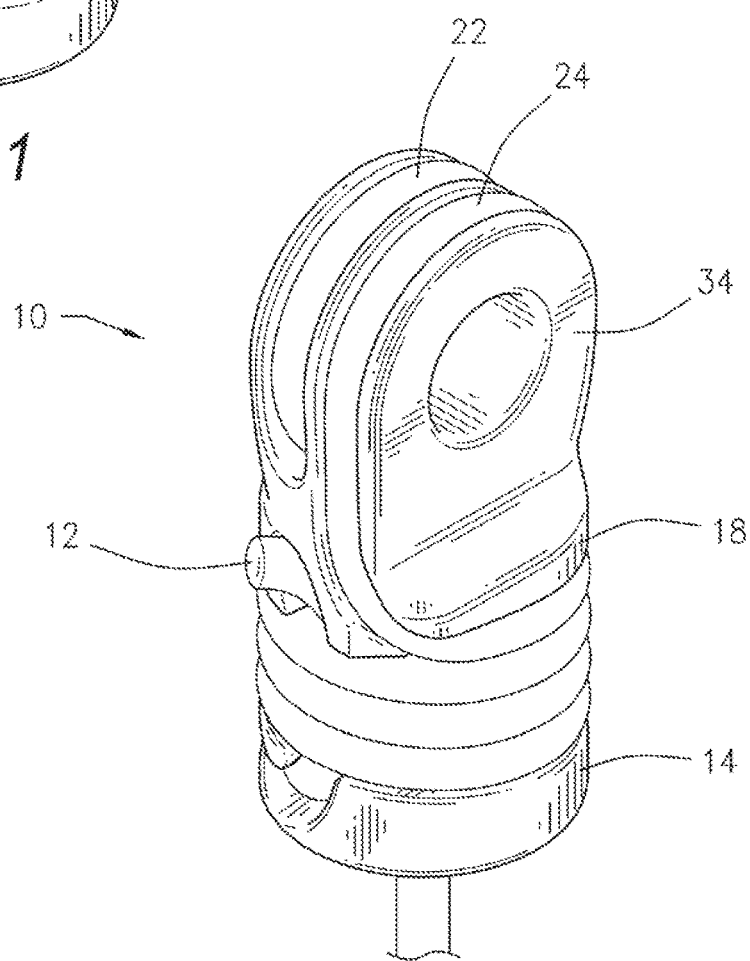
FIG. 2 illustrates a perspective view of the rope termination device shown in FIG. 1 with a rope, cable or cord fully installed or rigged on the termination device.

FIG. 2 illustrates the device 10 shown in FIG. 1 with a rope or cord 12 fully installed or rigged on the termination device 10.

Figure 3:
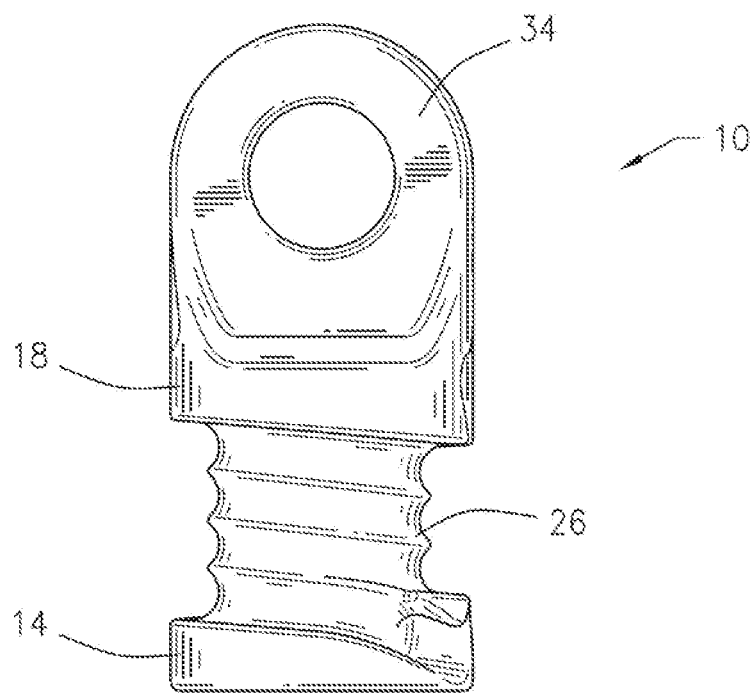
FIG. 3 illustrates a side view of the rope termination device shown in FIG. 1 before installation of the rope.
Figure 4:
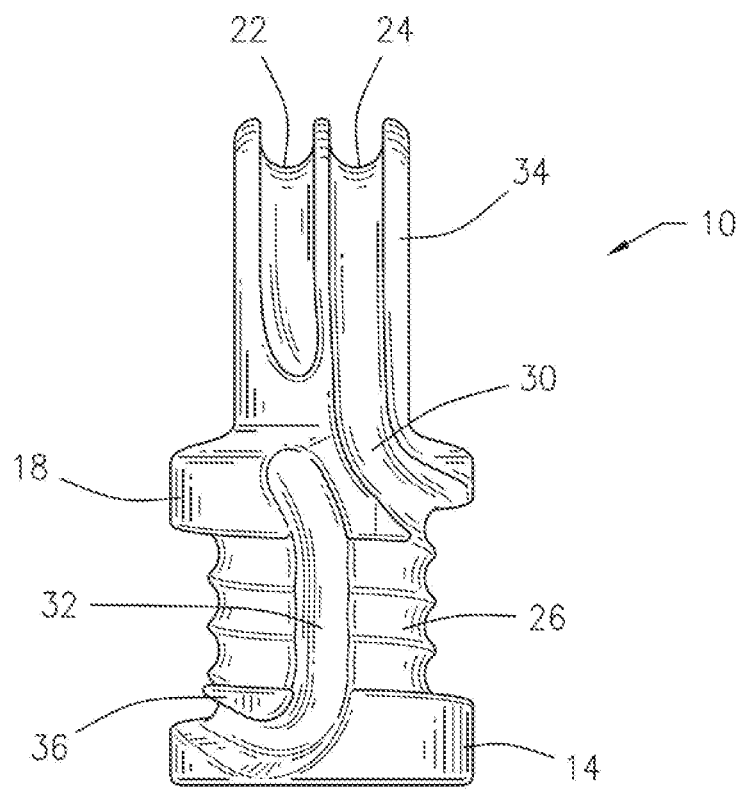
FIG. 4 illustrates a front view of the rope termination device shown in FIG. 1.
Figure 5:
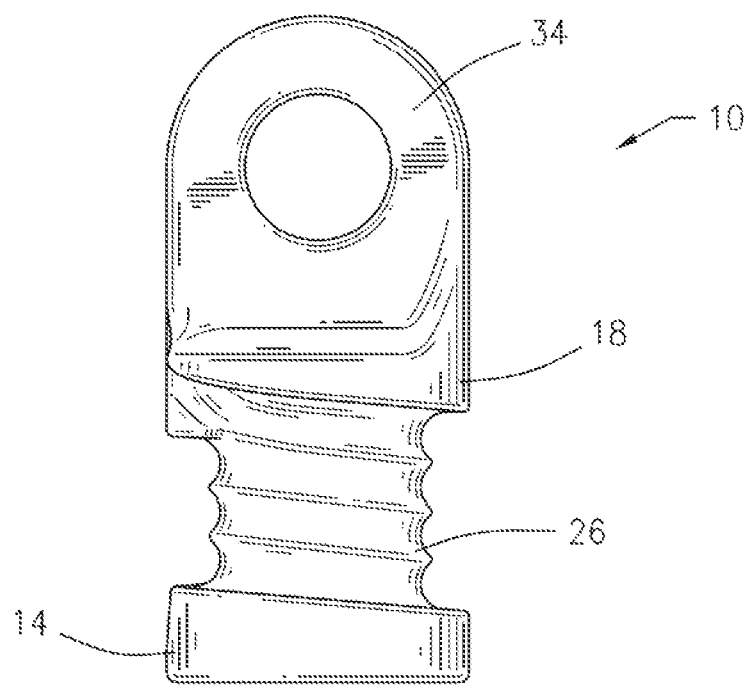
FIG. 5 illustrates an opposed side view of the rope termination device shown in FIG. 1.
Figure 6:
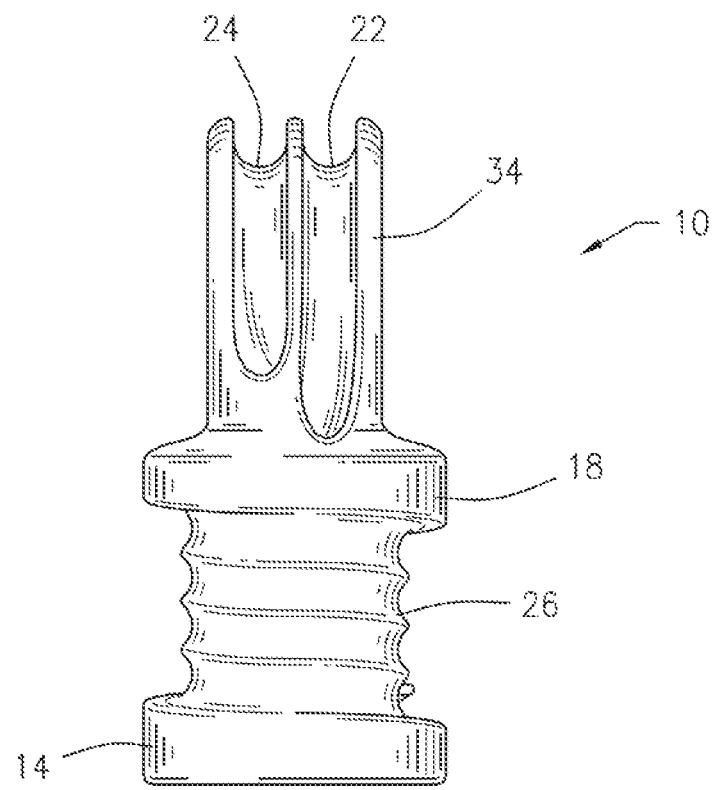
FIG. 6 illustrates a rear view of the rope termination device shown in FIG. 1.

FIG. 3 illustrates a side view of the termination device 10 shown in FIG. 1 before installation of the rope, FIG. 4 illustrates a front view of the device 10 shown in FIG. 1, FIG. 5 illustrates an opposed side view of the device 10 shown in FIG. 1, and FIG. 6 illustrates a rear view of the device 10 shown in FIG. 1.

Figure 7:
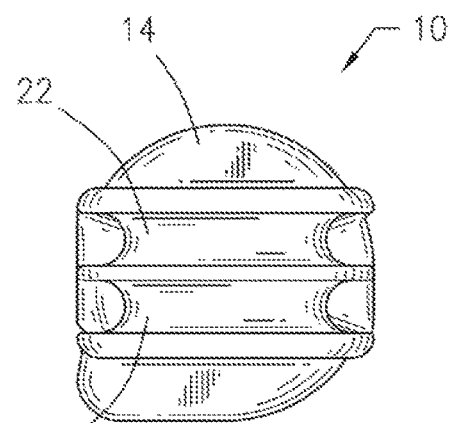
FIG. 7 illustrates a top view of the tope termination device shown in FIG. 1.
Figure 8:
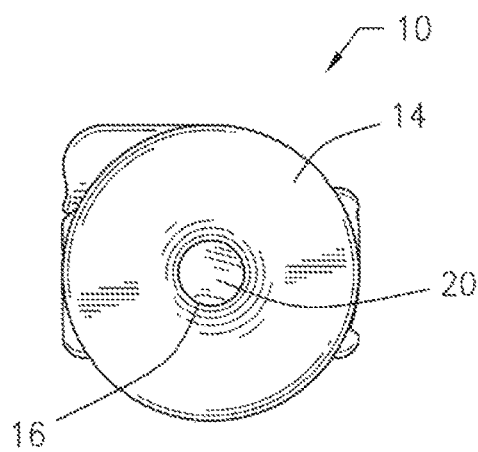
FIG. 8 illustrates a bottom view of the rope termination device shown in FIG. 1.

FIG. 7 illustrates a top view of the termination device 10 and FIG. 8 illustrates a bottom view of the termination device 10.

The termination device 10 is used to terminate a rope, cable or cord for subsequent connection to other equipment, such as lifting or hoisting equipment (not shown). Non-limiting examples of lifting or hoisting equipment might be various types of shackles. The device 10 is used to terminate a rope, cable or cord such as, but not limited to, a synthetic rope or cord 12 fabricated from fibers, cords, nylon or polyester.

The termination device 10 includes an elongated, substantially cylindrical body 14. In a preferred embodiment, the body 14 is fabricated from metal although other materials are possible within the spirit and scope of the invention.

As best seen in the bottom view in FIG. 8, the termination device 10 has a first opening 16 in a first axial end of the cylindrical body 14.

The termination device 10 also includes a second opening 48 in a second end 18 opposed to the first end of the cylindrical body 14. (The second opening 48 may be seen in FIG. 9 wherein the device 10 is shown in dashed lines). As seen in FIG. 8, a passageway 20 connects the first opening 16 with the second opening 48 so that an internal passageway 20 is provided through the body 14. Accordingly, the internal passageway 20 provides a somewhat central bore through the elongated cylindrical body 14.

As best seen in FIGS. 1, 4 and 6, at least one circular channel extends from the cylindrical body 14. In the preferred embodiment shown, a pair of adjacent and aligned circular channels 22 and 24 are in communication with the second opening 48 of the second end 18 of the body 14. The circular channels have a dimension slightly larger than the diameter of the rope.

The termination device 10 also includes a rope self-tightening or self-retaining mechanism. A continuous helical groove 26 extends around a circumference of the cylindrical body 14 to form a corkscrew pattern in order to receive the rope, cable or cord 12 forming windings around the cylindrical body 14. The helical groove has a dimension slightly larger than the diameter of the rope.

As best seen in FIG. 4, a transition groove 30 joins and is provided between the circular channels 22 and 24 and the continuous helical groove 26. When the rope 12 is installed, the transition groove 30 assures that there is no abrupt bend between the circular channels and the helical groove 26.

Also as seen in FIG. 4, a transverse groove 32, substantially transverse to the continuous helical groove 26, extends from and is connected to the helical groove 26. In addition, a protrusion or post 36 extends radially from the cylindrical body 14 so that the rope in the continuous groove 26 will be bent around the post 36 and be inserted under the rope windings in the continuous groove 26.

An attachment connector 34 extends from the second end 18 of the cylindrical body 14. In the preferred embodiment shown, the attachment connector has an eye having an axis substantially perpendicular to the axis of the body 14. The eye of the attachment connector 34 is within and passes through the circular channels 22 and 24.

The eye of the attachment connector may be used for attachment to lifting or hoisting equipment (not shown).

Figure 9:
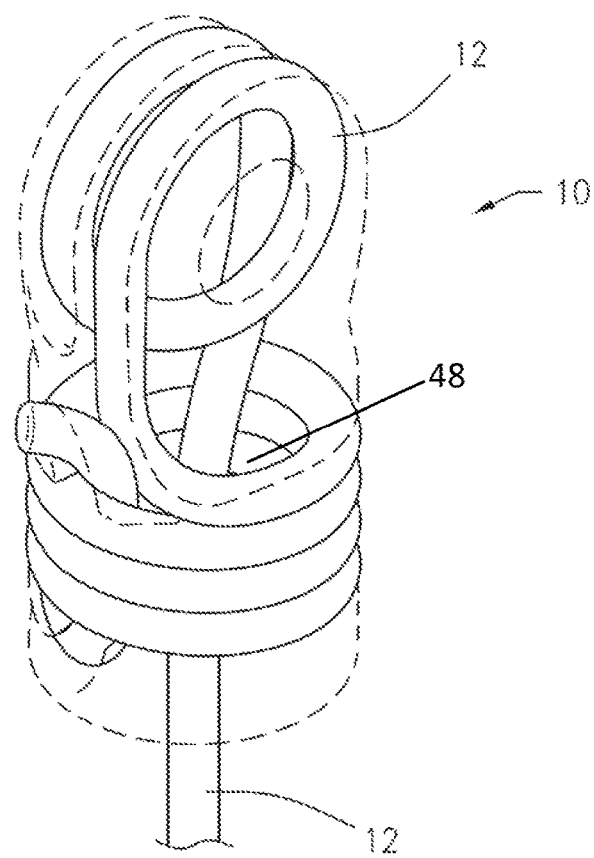
FIG. 9 illustrates the rope termination device shown in FIG. 2 in dashed lines so that the rope is visible.

FIG. 9 illustrates the termination device 10 in dashed lines so that the rope 12 installed or rigged to the termination device is visible.

Figure 10:
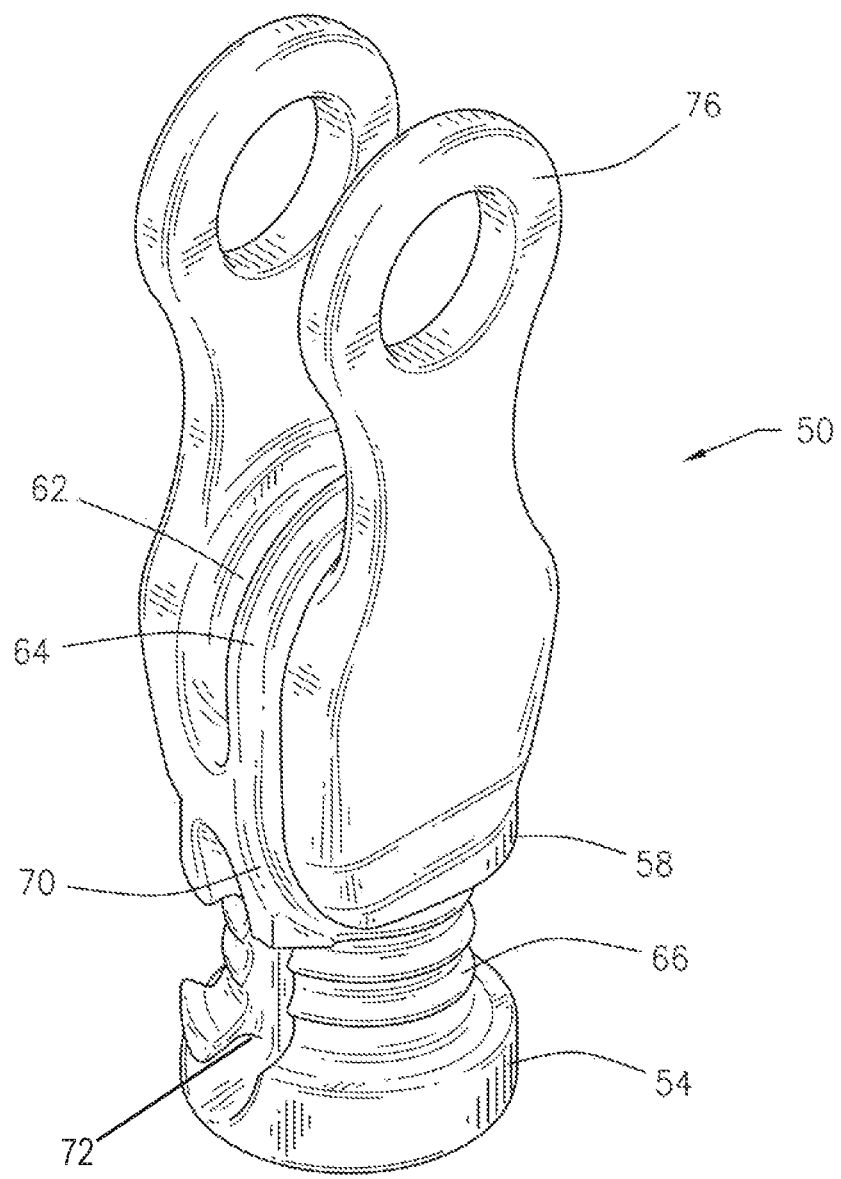
FIG. 10 illustrates a second preferred embodiment of the rope termination device of the present invention.

FIG. 10 illustrates a perspective view of a second preferred embodiment of a rope termination device 50 for a rope, cable or cord (not seen in FIG. 10). The termination device 50 includes an elongated, substantially cylindrical body 54. In a preferred embodiment, the body 54 is fabricated from metal although other materials are possible within the spirit and scope of the invention.

The termination device has a first opening (not visible in FIG. 10) in a first axial end of the cylindrical body 54. The device 50 also includes a second opening in a second end 58 opposed to the first end of the cylindrical body 54. A passageway (not visible in FIG. 10) connects the first opening with the second opening so that an internal passageway is formed. Accordingly, the internal passageway provides a somewhat central bore through the elongated body.

A pair of adjacent circular channels 62 and 64 is in communication with the second opening of the second axial end 58. The circular channels have a dimension slightly larger than the diameter of the rope.

A rope self-tightening or self-retaining mechanism includes a continuous helical groove 66 extending around the circumference of the cylindrical body 54 in a cork screw pattern to receive the rope therein. A transition groove 70 between the circular channels 62 and 64 and the continuous helical groove 66 assures that there is no abrupt bend in the rope.

A transverse groove 72, substantially transverse to the continuous helical groove 66, extends from and is connected to the helical groove 66. In addition, a protrusion or post extends radially from the body so that the rope in the continuous groove will be bent and then inserted under the rope windings.

An attachment connector extending from the second end is in the form of a clevis 76 having a pair of extending legs with aligned openings therethrough.

Returning to a consideration of FIGS. 1 through 9, in order to terminate a rope or cord with the first embodiment of the device 10, the rope is first threaded into the first opening 16 in the first axial end of the body 14. The rope 12 is thereafter threaded through the internal passageway 20 and out through the opposed second end of the body 14. The rope 12 is thereafter sequentially passed around the pair of circular channels 22 and 24.

The rope 12 is thereafter inserted into the transition groove 30 before being installed in the continuous helical groove 26 circumnavigating the body 14.

The end of the rope 12 is finally passed around the post 36 extending radially from the body 14 and in the transverse groove 32 beneath the rope windings in the continuous helical groove 26 so that the end of the rope 12 is retained in place.

The termination device 10 may then be connected to a lifting or hoisting assembly with the attachment connector 34.

The present invention provides a rope termination device that may be installed or rigged in the field without any tools or fasteners. Additionally, the rope termination device that minimizes bends in the rope in order to maximize efficiency of the device or fitting.

Whereas, the invention has been described in relation to the drawings attached hereto, it should be understood that other and further modifications, apart from those shown or suggested herein, may be made within the scope of this invention.

What is claimed is:

1. A rope termination device which comprises:
    a cylindrical body having a first opening in a first axial end of said body;
    a second opening in an opposed, second end of said body connected by a passageway through said body to said first opening;
    at least one circular channel in communication with said second opening;
    a continuous helical groove around a circumference of said cylindrical body; and
    an attachment connector near said second end of said body.

2. The rope termination device as set forth in claim 1 wherein said at least one circular channel comprises a pair of adjacent circular channels.

3. The rope termination device as set forth in claim 1 wherein said attachment connector comprises an eye having an axis perpendicular to an axis of said body.

4. The rope termination device as set forth in claim 1 wherein said attachment connector comprises a clevis extending from said at least one circular channel.

5. The rope termination device as set forth in claim 1 including a transition groove joining said at least one circular channel and said continuous helical groove.

6. The rope termination device as set forth in claim 1 wherein a rope is threaded into said body from said first opening, through said passageway, and out of said second opening of said body, threaded around said at least one circular channel and thereafter in said continuous helical groove with an end of said rope inserted beneath windings of said rope in said continuous helical groove.

7. The rope termination device as set forth in claim 1 including a post extending radially from said body and a further groove transverse to said continuous helical groove.

8. The method of terminating a rope, which method comprises:
    threading a rope into a first axial opening in a cylindrical body, through a passageway through said body, and out of an opposed second end of said body;
    thereafter passing said rope around at least one circular channel; and
    thereafter winding said rope around a continuous helical groove around a circumference of said cylindrical body in a corkscrew pattern to form windings while inserting an end of said rope beneath said windings.

9. The method of terminating a rope as set forth in claim 8 wherein said step of passing said rope around at least one circular channel comprises passing said rope around two adjacent said circular channels in sequence.

10. The method of terminating a rope as set forth in claim 8 wherein said step of inserting an end of said rope beneath said windings includes inserting said end in a further groove transverse to said continuous helical groove.

11. The method of terminating a rope as set forth in claim 8 including providing an attachment connector near said second end of said body.

12. The method of terminating a rope as set forth in claim 11 wherein said attachment connector comprises an eye having an axis perpendicular to an axis of said body.

13. The method of terminating a rope as set forth in claim 11 wherein said attachment connector comprises a clevis extending from said at least one circular channel.

14. A rope termination device which comprises:
    a cylindrical body having a first opening in a first end of said body, and a second opening in an opposed, second end of said body connected by a passageway therethrough for receipt of a rope; and
    a rope self-tightening mechanism having a continuous helical groove around a circumference of said cylindrical body in a corkscrew pattern to receive said rope therein to form windings with an end of said rope beneath said windings of said rope.

15. The rope termination device as set forth in claim 14 including an attachment connector near said second end of said body.

16. The rope termination device as set forth in claim 15 wherein said attachment connector comprises an eye perpendicular to an axis of said body.

17. The rope termination device as set forth in claim 15 wherein said attachment connector comprises a clevis.

* * * * *